(12) United States Patent
Chen et al.

(10) Patent No.: US 12,390,965 B2
(45) Date of Patent: Aug. 19, 2025

(54) MULTI-MOLD BLOCK DRIVE DEVICE AND INJECTION MOLDING MACHINE HAVING THE MULTI-MOLD BLOCK DRIVE DEVICE

(71) Applicants: Cheng-Ho Chen, Changhua County (TW); Chih-Tsung Kuo, Taichung (TW)

(72) Inventors: Cheng-Ho Chen, Changhua County (TW); Chih-Tsung Kuo, Taichung (TW); Chuen-Cherng Yang, Taichung (TW)

(73) Assignees: Cheng-Ho Chen, Huatan Township (TW); Chih-Tsung Kuo, Taichung (TW)

( * ) Notice: Subject to any disclaimer, the term of this patent is extended or adjusted under 35 U.S.C. 154(b) by 206 days.

(21) Appl. No.: 18/337,862

(22) Filed: Jun. 20, 2023

(65) Prior Publication Data
US 2023/0405889 A1 Dec. 21, 2023

(30) Foreign Application Priority Data

Jun. 21, 2022 (TW) .................................. 111123095

(51) Int. Cl.
*B29C 45/06* (2006.01)
*B29C 45/17* (2006.01)
(52) U.S. Cl.
CPC .......... *B29C 45/06* (2013.01); *B29C 45/1761* (2013.01); *B29C 2045/065* (2013.01)
(58) Field of Classification Search
None
See application file for complete search history.

(56) References Cited

U.S. PATENT DOCUMENTS

| 4,685,184 A | * | 8/1987 | Satkamp | ............... F16C 13/006 |
| | | | | 384/275 |
| 4,692,039 A | * | 9/1987 | Teramachi | .............. F16C 29/00 |
| | | | | 384/49 |

(Continued)

FOREIGN PATENT DOCUMENTS

| CN | 202239570 U | | 5/2012 |
| CN | 204957680 U | * | 1/2016 |

(Continued)

OTHER PUBLICATIONS

Machine translation JPH0604426U (Year: 1994).*

(Continued)

*Primary Examiner* — Abbas Rashid
*Assistant Examiner* — Wayne K. Swier
(74) *Attorney, Agent, or Firm* — MUNCY, GEISSLER, OLDS & LOWE, P.C.

(57) ABSTRACT

A multi-mold block drive device includes a guide seat and a plurality of speed reductions units. The guide seat includes opposite inner and outer peripheral surfaces, and a plurality of spaced-apart guide holes extending through the inner and outer peripheral surfaces. A plurality of drivers correspond respectively to the guide holes. Each speed reduction unit is connected between one of the guide holes and a corresponding driver, and includes a guide screw rod having an externally threaded portion, a guide sleeve having an internal thread facing the externally threaded portion, and a plurality of planetary screws interposed between the guide screw rod and the guide sleeve. Each planetary screw has a drive thread meshing with the externally threaded portion and the internal thread. An injection molding machine having the multi-mold block drive device is also disclosed.

6 Claims, 7 Drawing Sheets

(56) References Cited

U.S. PATENT DOCUMENTS

| | | | | |
|---|---|---|---|---|
| 5,186,545 | A | * | 2/1993 | Shirai .................. F16C 29/063 384/43 |
| 6,029,428 | A | * | 2/2000 | Terminella .......... B29C 66/8412 53/139.2 |
| 9,669,573 | B2 | * | 6/2017 | Kariya .................... B29C 45/50 |
| 11,400,641 | B2 | * | 8/2022 | Neboian ................ B33Y 40/00 |

FOREIGN PATENT DOCUMENTS

| | | | | | |
|---|---|---|---|---|---|
| CN | 116692482 | A | * | 9/2023 | |
| EP | 3098052 | A1 | * | 11/2016 | ......... B29C 45/0005 |
| JP | 06-04426 | U | * | 1/1994 | |
| TW | M547433 | U | | 8/2017 | |
| TW | I673446 | B | | 10/2019 | |
| WO | WO-0074922 | A1 | * | 12/2000 | ....... B29D 11/00413 |
| WO | WO-2014170932 | A1 | * | 10/2014 | ............. B29B 7/248 |

OTHER PUBLICATIONS

Machine translation CN202239570U (Year: 2012).*
Machine translation WO2014170932A1 (Year: 2014).*
Machine translation TWI673446B (Year: 2019).*
Torque Transmission, What is a Speed Reducer? How does a Speed Reducer work? https://www.torquetrans.com/blog/how-a-speed-reducer-works (Year: 2020).*
Machine translation CN116692482A (Year: 2023).*
Machine translation CN204957680U (Year: 2016).*
Search Report appended to an Office Action, which was issued to Taiwanese counterpart application No. 111123095 by the TIPO on Jun. 29, 2023, with an English translation thereof; pp. 1-2.

* cited by examiner

MULTI-MOLD BLOCK DRIVE DEVICE AND INJECTION MOLDING MACHINE HAVING THE MULTI-MOLD BLOCK DRIVE DEVICE

CROSS-REFERENCE TO RELATED APPLICATION

This application claims priority to Taiwanese Invention Patent Application No. 111123095, filed on Jun. 21, 2022.

FIELD

The disclosure relates to a multi-mold block drive device for positioning a mold and an injection molding machine having the multi-mold block drive device.

BACKGROUND

An existing multi-slider hybrid power mold guide device for a die casting machine, as disclosed in Chinese Patent Publication No. CN202239570U, includes a base support, a plurality of elbow linkage mechanisms, a plurality of molds, a plurality of pneumatic cylinders, and a plurality of hydraulic cylinders. Through movement of the shaft of each pneumatic cylinder in the direction of an axis thereof, each elbow linkage mechanism is driven by the shaft of the corresponding pneumatic cylinder to slidingly move the corresponding mold relative to the base support to achieve the opening or closing of the mold. An additional locking force is applied by the corresponding oil cylinder to the mold after the mold is closed.

Although the aforesaid multi-slider hybrid power guide mold device can achieve its intended purpose, there is room for improvement of the structure thereof.

SUMMARY

Therefore, an object of the present disclosure is to provide a multi-mold block drive device that has a simple structure.

According to this disclosure, the multi-mold block drive device suitable for driving a plurality of mold blocks includes a guide seat, a plurality of drivers and a plurality of speed reductions units. The guide seat includes an inner peripheral surface surrounding an axis and defining a mold hole, an outer peripheral surface opposite to the inner peripheral surface, and a plurality of spaced-apart guide holes surrounding the mold hole. Each guide hole extends through the inner and outer peripheral surfaces along a central line transverse to the axis, and communicates with the mold hole.

The drivers are disposed spaced apart from the outer peripheral surface, are positioned relative to the guide seat, and correspond respectively to the guide holes. Each speed reduction unit is connected between one of the guide holes and a corresponding one of the drivers, and includes a guide screw rod that extends along the central line and that has a non-threaded portion connected to the corresponding driver and an externally threaded portion opposite to the non-threaded portion along the central line, a guide sleeve sleeved on the guide screw rod and having an internal thread facing the externally threaded portion, and a plurality of planetary screws parallel to the guide screw rod and interposed between the guide screw rod and the guide sleeve. Each planetary screw has a drive thread meshing with the externally threaded portion and the internal thread. The guide sleeve of each speed reduction unit is configured to be connected to a corresponding one of the mold blocks.

When the guide screw rod of each speed reduction unit is driven by the corresponding driver to rotate, the planetary screws are driven by the guide screw rod to rotate and move linearly along the externally threaded portion, and the guide sleeve is in turn driven by the planetary screws to move linearly therealong.

Another object of the present disclosure is to provide an injection molding machine that has the multi-mold block drive device and that can alleviate at least one of the drawbacks of the prior art.

According to another aspect of this disclosure, the injection molding machine includes a machine base, a feeding unit, a material feed backflow prevention device, a multi-mold block drive device, and a pair of molds. The feeding unit is mounted on the machine base for feeding a linear material, and includes a plurality of pull wheel assemblies spaced apart from each other along an axis, and a motor for driving the pull wheel assemblies. The material feed backflow prevention device is mounted on the machine base and is located on a side of the feeding unit for preventing backflow of the linear material during feeding. The multi-mold block drive device is mounted on the machine base and is located on a side of the material feed backflow prevention device.

The multi-mold block drive device is suitable for driving a plurality of mold blocks, and includes a guide seat, a plurality of drivers, and a plurality of speed reduction units. The guide seat includes an inner peripheral surface surrounding an axis and defining a mold hole, an outer peripheral surface opposite to the inner peripheral surface, a plurality of spaced-apart mold grooves formed in the inner peripheral surface and communicating with the mold hole, and a plurality of spaced-apart guide holes each of which extends through the outer peripheral surface along a central line transverse to the axis and communicates with a respective one of the mold grooves. The drivers are disposed spaced apart from the outer peripheral surface, are positioned relative to the guide seat, and correspond respectively to the guide holes.

Each speed reduction unit is connected between one of the guide holes and a corresponding one of the drivers, and includes a guide screw rod that extends along the central line and that has a non-threaded portion connected to the corresponding one of the drivers and an externally threaded portion opposite to the non-threaded portion along the central line, a guide sleeve sleeved on the guide screw rod and having an internal thread facing the externally threaded portion, and a plurality of planetary screw parallel to the guide sleeve and interposed between the guide screw rod and the guide sleeve. Each planetary screw has a drive thread meshing with the externally threaded portion and the internal thread. The guide sleeve of each speed reduction unit is configured to be connected to a corresponding one of the mold blocks.

When the guide screw rod is driven by the corresponding one of the drivers to rotate, the planetary screws are driven by the guide screw rod to rotate and move linearly along the externally threaded portion, and the guide sleeve is in turn driven by the planetary screws to move linearly therealong.

The pair of molds are disposed in two opposite ones of the mold grooves, are located at a material discharge end of the material feed backflow prevention device, and are capable of receiving a flowable raw material extruded from the material discharge end. The pair of molds are configured to be clamped and locked by the mold blocks when the mold blocks are driven by the multi-mold block drive device to move toward each other.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
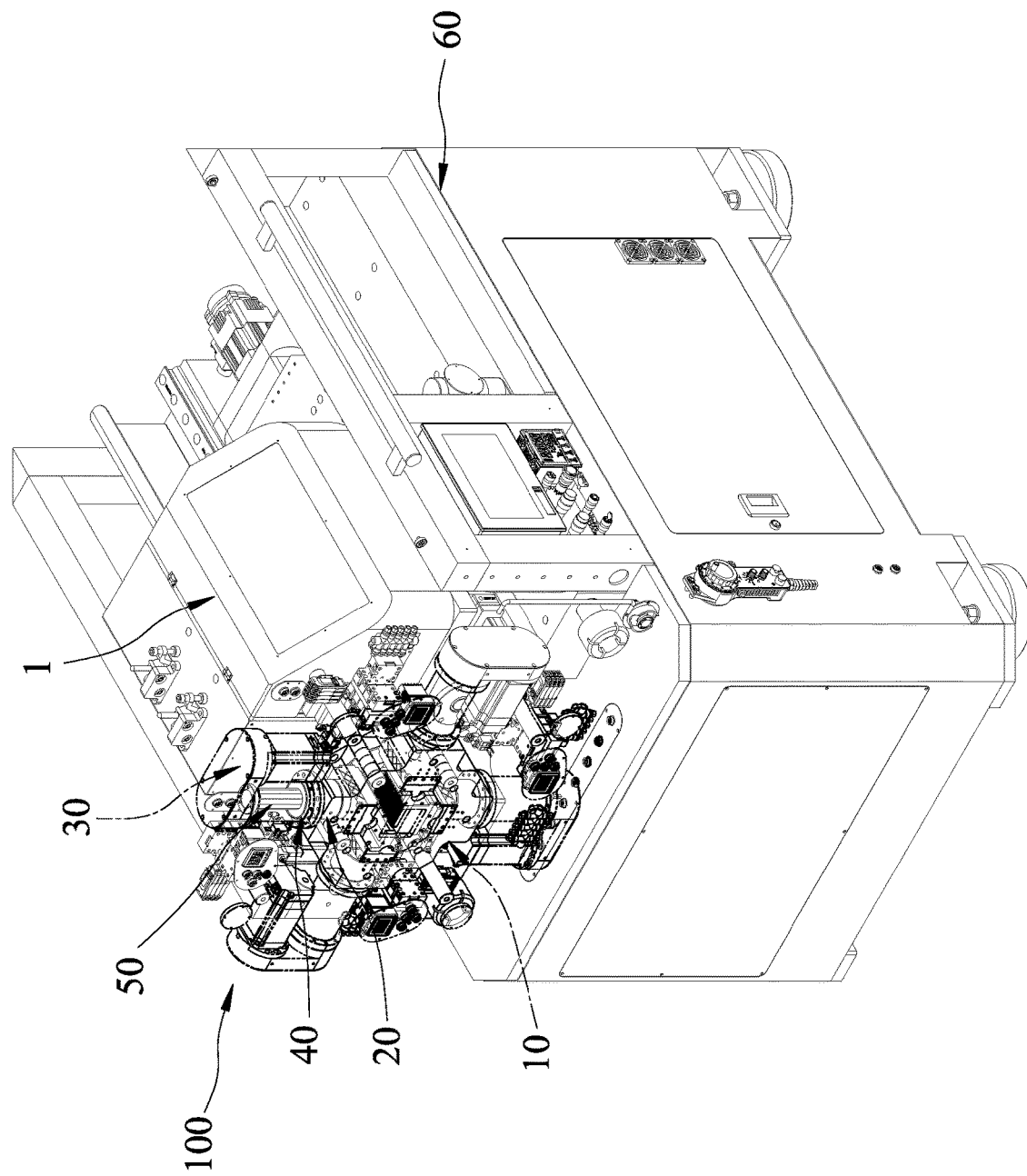
FIG. 1 is a perspective view of an injection molding machine according to an embodiment of the present disclosure.

Referring to FIGS. 1 to 3 and 7, a multi-mold block drive device 100 according to an embodiment of the present disclosure is suitable for mounting on an injection molding machine 1 which is used for producing optical lenses, and is capable of driving a plurality of mold blocks 101 to lock a pair of molds 102. The multi-mold block drive device 100 includes a guide seat 10, a plurality of linear bearing units 20, a plurality of drivers 30, a plurality of positioning sleeves 40, and a plurality of speed reduction units 50. The injection molding machine 1 further includes a machine base 60, a feeding unit 70, and a material feed backflow prevention device 80.

The guide seat 10 includes an inner peripheral surface 12, an outer peripheral surface 13 opposite to the inner peripheral surface 12, and a plurality of guide holes 14. The inner peripheral surface 12 surrounds an axis (L) and defines a mold hole 11. The inner peripheral surface 12 has a cross-section perpendicular to the axis (L) that is cross-shape, and has four mold grooves 121 that extend inwardly therefrom, that are spaced apart from each other by 90 degrees, and that surround and communicate with the mold hole 11. In this embodiment, there are four guide holes 14 each radially extending through the outer peripheral surface 13 along a central line (L1) transverse to the axis (L) and communicating with a respective one of the mold grooves 121.

Figure 2:
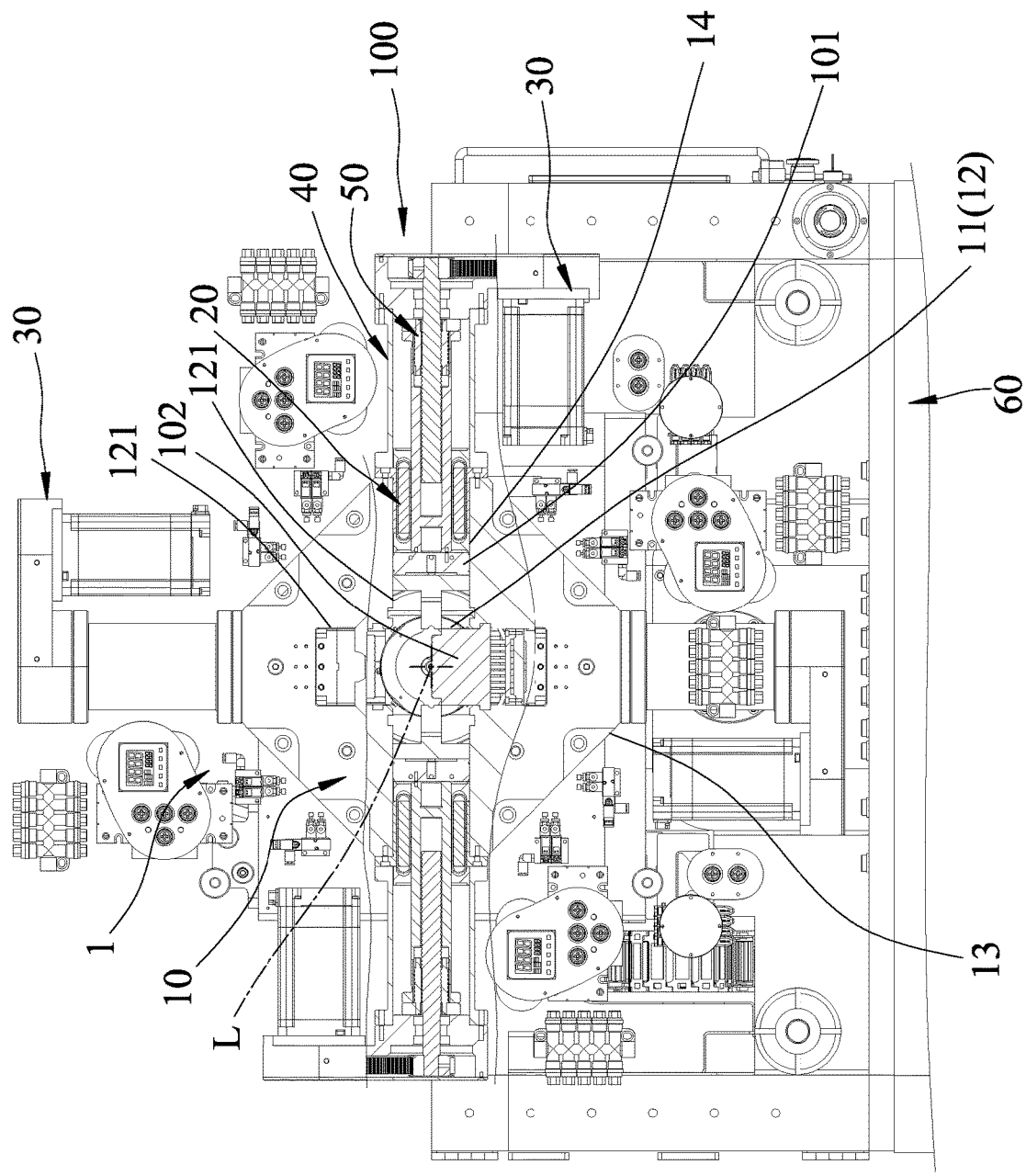
FIG. 2 is a schematic plan view of the embodiment.
Figure 3:
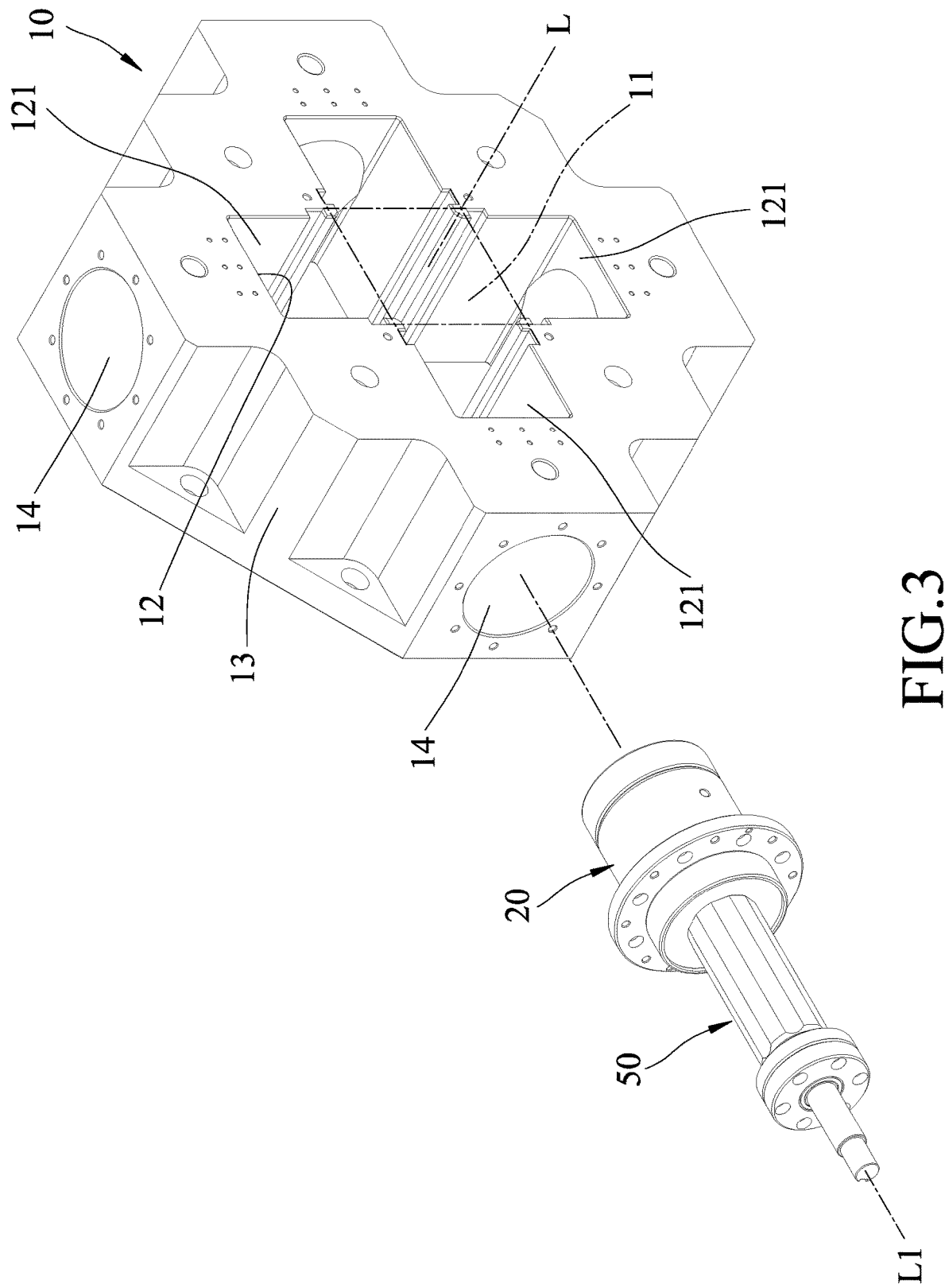
FIG. 3 is an enlarged exploded perspective view of a guide seat and an assembly of a linear bearing unit and a speed reduction unit of a multi-mold block drive device of the embodiment.
Figure 4:
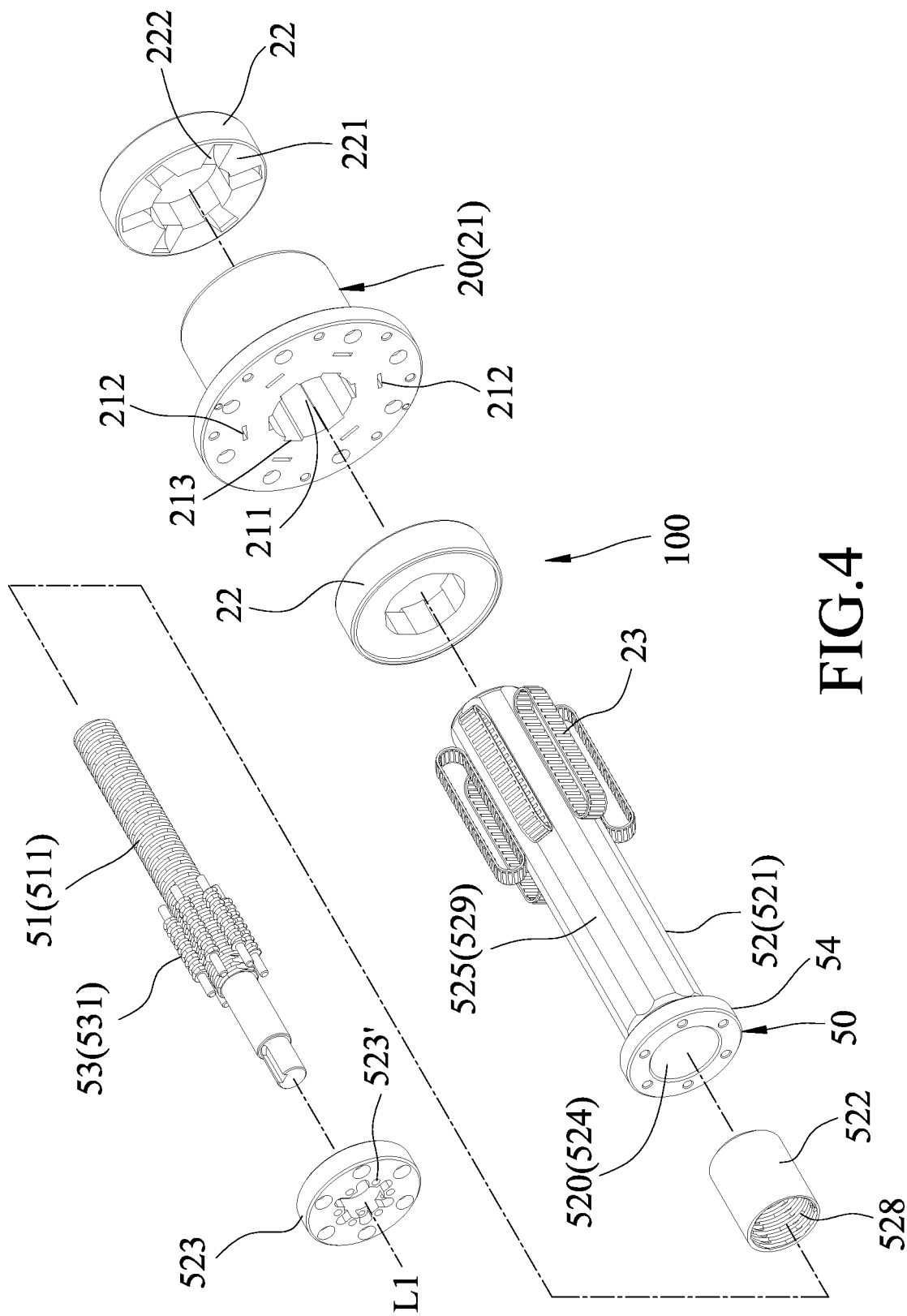
FIG. 4 is an exploded perspective view of the linear bearing unit and the speed reduction unit of the multi-mold block drive device of the embodiment.
Figure 5:
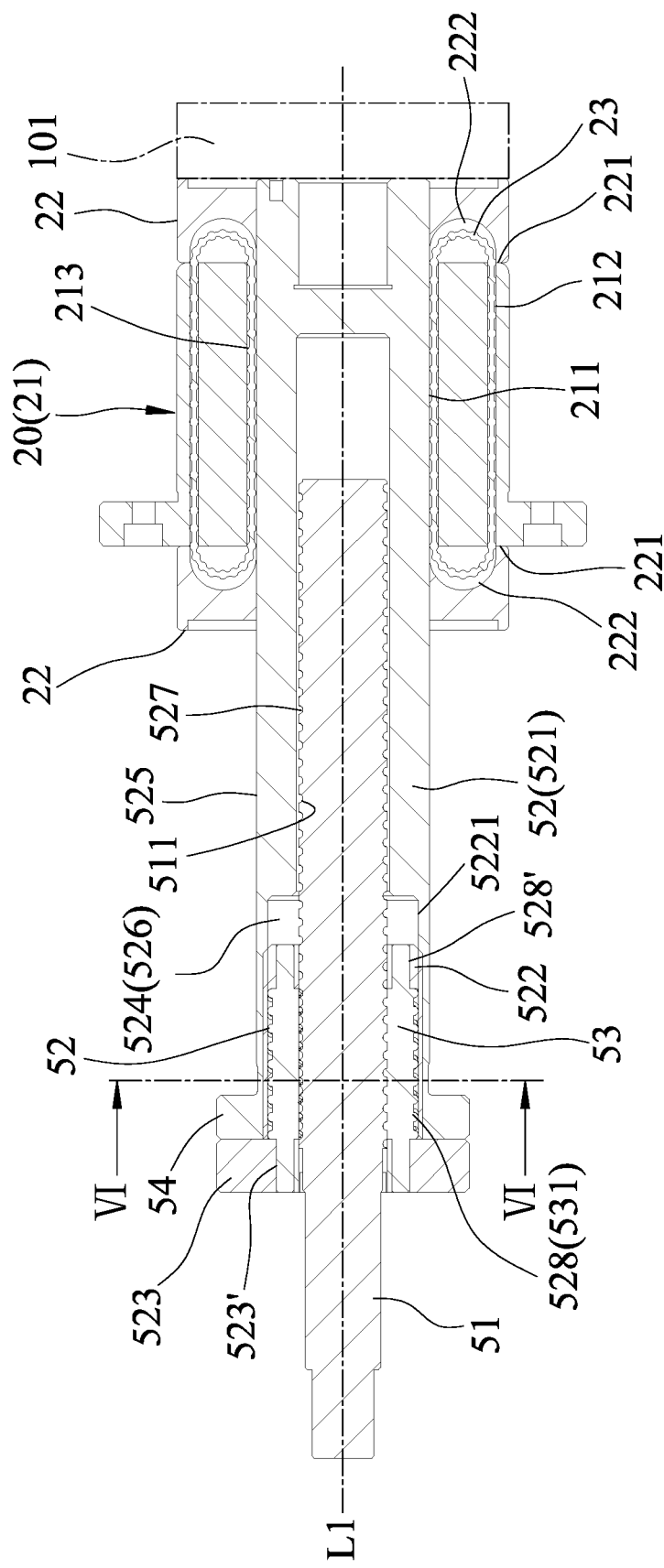
FIG. 5 is an assembled sectional view of the linear bearing unit and the speed reduction unit of the multi-mold block drive device of the embodiment.
Figure 6:
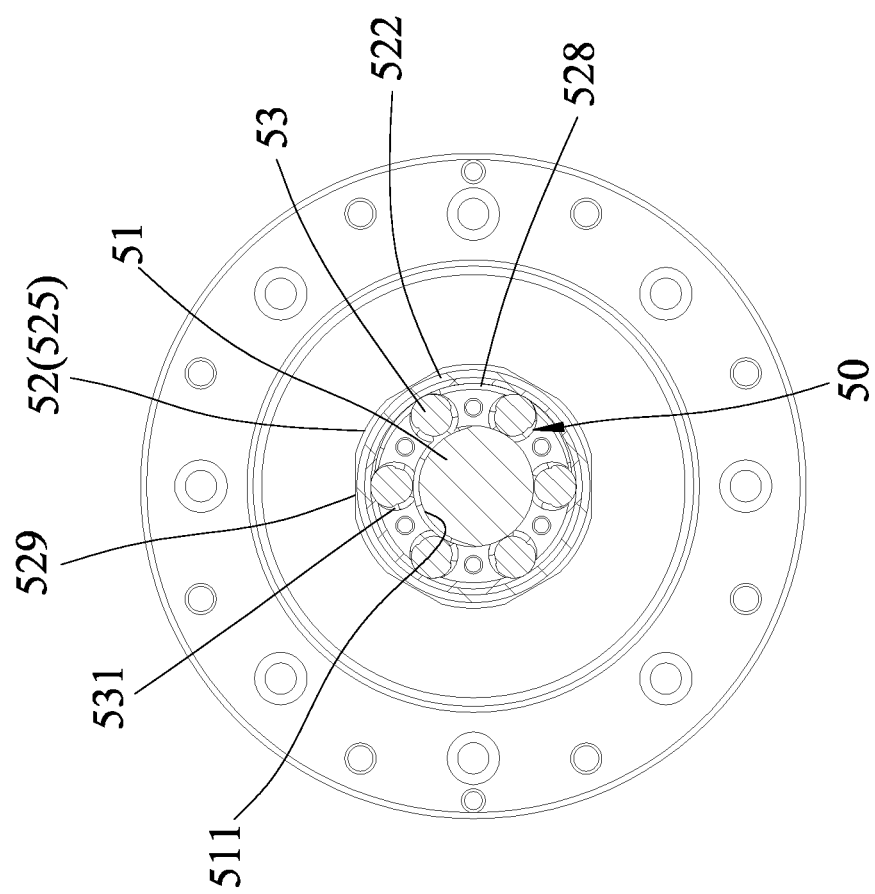
FIG. 6 is a sectional view taken along line VI-VI of FIG. 5.

Referring to FIGS. 4 and 5, in combination with FIGS. 1 to 3, each of the linear bearing units 20 is mounted in a respective one of the guide holes 14, and includes a main body 21, two sealing covers 22 disposed on two opposite ends of the main body 21 along the central line (L1), and a plurality of track roller units 23 disposed between the main body 21 and the sealing covers 22. The main body 21 has a central hole 211 extending along the central line (L1), and a plurality of equiangularly spaced-apart through grooves 212 spaced apart from and surrounding the central hole 211 and parallel to the central line (L1). The central hole 211 is defined by a hole-defining wall. The hole-defining wall of the central hole 211 is formed with a plurality of inward grooves 213 respectively corresponding to the through grooves 212. Each sealing cover 22 is a hollow short cylinder, and has an inner end surface 221 abutting against a respective one of the two opposite ends of the main body 21, and a plurality of angularly spaced-apart bearing grooves 222 formed in the inner end surface 221 and respectively communicating with the through grooves 212 and the inward grooves 213. Each of the track roller units 23 has one end, and the other end that passes through one of the through grooves 212, that loops around a groove wall of a corresponding one of the bearing grooves 222 of one of the sealing covers 22, that extends through a corresponding one of the inward grooves 213, that loops around a groove wall of a corresponding one of the bearing grooves 222 of the other sealing cover 22, and that is then connected to the one end thereof so as to form a closed loop.

The drivers 30 are disposed spaced apart from the outer peripheral surface 13 of the guide seat 10, are positioned relative to the guide seat 10, and correspond respectively to the guide holes 14. The drivers 30 of this embodiment are fixed on the machine base 60, and each driver 30 employs a servo motor with a driving pulley set.

Each positioning sleeve 40 is connected between the main body 21 of one of the linear bearing units 20 and a corresponding one of the drivers 30. Each positioning sleeve 40 is hollow cylindrical in shape, and is spaced apart from and surrounds an outer portion of a respective one of the speed reduction units 50.

With reference to FIGS. 3 to 6, each speed reduction unit 50 is connected between one of the linear bearing units 20 and a corresponding one of the drivers 30, and includes a guide screw rod 51, a guide sleeve 52, and a plurality of planetary screws 53.

The guide screw rod 51 extends along the central line (L1), and has a non-threaded portion 512 with one end connected to the corresponding driver 30, and an externally threaded portion 511 opposite to the non-threaded portion 512 along the central line (L1).

The guide sleeve 52 is sleeved on the guide screw rod 51, and includes an outer sleeve 521, an inner sleeve 522 fixed inside the outer sleeve 521, and an annular plate 523 fixed to one end of the outer sleeve 521. The outer sleeve 521 has an inner surface 520 formed with a stepped inner bore 524 that extends along the central line (L1), an outer surface 525 opposite to the inner surface 520, and an end flange 54 extending outwardly and radially from one end of the outer surface 525. The stepped inner bore 524 has a large-diameter section 526 adjacent to the end flange 54, and a small-diameter section 527 extending inwardly from the large-diameter section 526 away from the end flange 54 along the central line (L). The inner sleeve 522 is fixed in the large-diameter section 526, and has an internal thread 528 facing the externally threaded portion 511, and an annular end wall 5221 connected to an end periphery thereof that is distal to the end flange 54 and formed with a plurality of equiangularly spaced-apart inner pin holes 528' surrounding the central line (L1). The externally threaded portion 511 of the guide screw rod 51 is threaded through the internal thread 528 of the inner sleeve 522 and is received in the small-diameter section 527.

The outer surface 525 of the outer sleeve 521 has a plurality of circumferentially spaced-apart guide planes 529 corresponding respectively to the track roller units 23 and parallel to the central line (L1). The track roller units 23 are interposed between the guide planes 529 and the main body 21 to reduce friction between the outer sleeve 521 and the main body 21. The annular plate 523 is sleeved on the guide screw rod 51, is located on the non-threaded portion 512 immediately adjacent to the externally threaded portion 511, and is fixed to the end flange 54. The annular plate 523 has a plurality of angularly spaced-apart outer pin holes 523' respectively coaxial with the inner pin holes 528'. The other end of the outer surface 525 of the outer sleeve 521 of the guide sleeve 52 of each speed reduction unit 50 that is opposite to the end flange 54 is connected to a corresponding one of the mold blocks 101.

The planetary screws 53 are parallel to the guide screw rod 51, and are interposed between the guide screw rod 51 and the inner sleeve 522. Specifically, the planetary screws 53 are angularly disposed around the guide screw rod 51, and are threadedly engaged between the externally threaded portion 511 and the internal thread 528 of the inner sleeve 522. Each of the planetary screws 53 has two opposite ends respectively received in one of the inner pin holes 528' and a corresponding one of the outer pin holes 523', and a drive thread 531 between the two opposite ends thereof and meshing with the externally threaded portion 511 and the internal thread 528.

Figure 7:
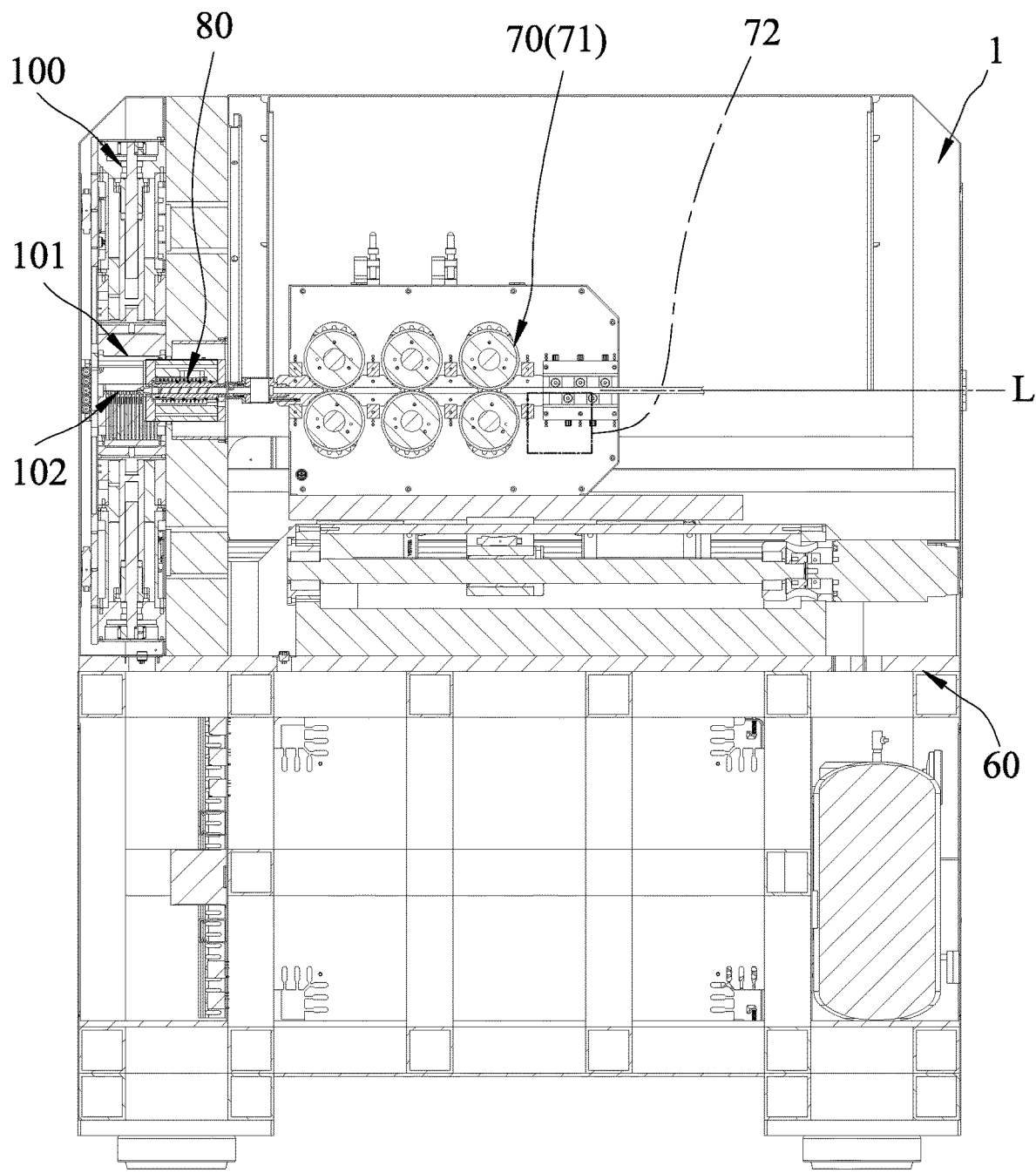
FIG. 7 is a sectional view of the injection molding machine of this disclosure.

Referring to FIG. 7, the feeding unit 70 of the injection molding machine 1 is disposed on the machine base 60, and includes a plurality of pull wheel assemblies 71 spaced apart from each other along the axis (L), and a motor 72 for driving the pull wheel assemblies 71 to rotate. Each of the pull wheel assemblies 71 includes upper and lower pull wheels. The pull wheel assemblies 71 are used for pulling a solid linear material to move toward the material feed backflow prevention device 80. The linear material may be a glass or plastic linear material.

The material feed backflow prevention device 80 is disposed on a side of the feeding unit 70 to prevent backflow of the linear material during feeding. The material feed backflow prevention device 80 is not an important feature of this disclosure, so that the detailed structure and operating principle thereof will not be described herein.

The pair of molds 102 of this embodiment are disposed in opposite upper and lower ones of the mold grooves 121, and are located at a material discharge end of the material feed backflow prevention device 80 for receiving a flowable raw material extruded from the material feed backflow prevention device 80.

To further understand the effect produced, the technical means applied, and the expected effect of the coordination of the components of this disclosure, they will be described again below, and it is believed that a more in-depth and specific understanding of this disclosure can be obtained thereby.

Referring to FIGS. 1, 2, 5 and 6, to use the injection molding machine 1 for performing an injection molding operation, the drivers 30 are first activated, and the guide screw rod 51 of each speed reduction unit 50 is then driven by the corresponding driver 30 to rotate about its own axis. Rotation of the guide screw rod 51 will, in turn, drive the planetary screws 53 to rotate and move linearly along the externally threaded portion 511. Through the meshing of the drive thread 531 of each planetary screw 53 with the externally threaded portion 511 and the internal thread 528, rotation of the planetary screws 53 will drive and push the inner sleeve 522 of the guide sleeve 52 together with the outer sleeve 521 to move linearly therealong. As such, the guide sleeves 52 of the speed reduction units 50 can drive the mold blocks 101 to move toward each other to lock the molds 102 or away from each other to open the molds 102.

During locking or opening of the molds 102, when the planetary screws 53 of each speed reduction unit 50 push the guide sleeve 52 thereof to move linearly along the center line (L1), the guide planes 529 on the outer surface 525 of the guide sleeve 52 are linearly guided by the track roller units 23 to keep accurate linear movement of the guide sleeve 52. A friction force between the guide sleeve 52 and the mating component is low when the guide sleeve 52 moves linearly, so that noise can be reduced, and the service life of the guide sleeve 52 can be prolonged.

After the mold blocks 101 are driven by the multi-mold block drive device 100 to clamp and lock the molds 102, the solid linear material can be pulled and moved toward the material feed backflow prevention device 80 through the feeding unit 70, and is transformed into a flowable raw material through the material feed backflow prevention device 80. Finally, the flowable raw material is extruded out of the material feed backflow prevention device 80 into the molds 102 to complete the injection molding of optical lenses.

In summary, each of the multi-mold block drive device 100 and the injection molding machine 1 of the present disclosure has a simple overall structure, is easy to manufacture and assemble, and has a good locking effect for the molds 102. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A multi-mold block drive device suitable for driving a plurality of mold blocks, comprising:
   a guide seat including an inner peripheral surface surrounding an axis and defining a mold hole, an outer peripheral surface opposite to said inner peripheral surface, and a plurality of spaced-apart guide holes surrounding said mold hole, each of said guide holes extending through said inner peripheral surface and said outer peripheral surface along a central line transverse to the axis and communicating with said mold hole;
   a plurality of drivers that are disposed spaced apart from said outer peripheral surface, that are positioned relative to said guide seat, and that correspond respectively to said guide holes;
   a plurality of speed reduction units each connected between one of said guide holes and a corresponding one of said drivers, each of said speed reduction units including a guide screw rod that extends along the central line and that has a non-threaded portion connected to the corresponding one of said drivers and an externally threaded portion opposite to said non-threaded portion along the central line, a guide sleeve sleeved on said guide screw rod and having an internal thread facing said externally threaded portion, and a plurality of planetary screws parallel to said guide screw rod and interposed between said guide screw rod and said guide sleeve, each of said planetary screws having a drive thread meshing with said externally threaded portion and said internal thread, said guide sleeve of each of said speed reduction units being configured to be connected to a corresponding one of the mold blocks; and
   a plurality of linear bearing units, each of said linear bearing units being disposed between one of said guide holes and a corresponding one of said speed reduction units, and including a main body, two sealing covers disposed on two opposite ends of said main body along the central line, and a plurality of track roller units disposed between said main body and said sealing covers, said guide sleeve further having an outer surface that is opposite to said internal thread and that has a plurality of circumferentially spaced-apart guide planes corresponding respectively to said track roller units and parallel to the central line;

wherein, when said guide screw rod of each of said speed reduction units is driven by the corresponding one of said drivers to rotate, said planetary screws are driven by said guide screw rod to rotate and move linearly along said externally threaded portion, and said guide sleeve is in turn driven by said planetary screws to move linearly therealong.

2. The multi-mold block drive device as claimed in claim 1, wherein said main body of each of said linear bearing units has a central hole extending along the central line, and a plurality of equiangularly spaced-apart through grooves spaced apart from and surrounding said central hole and parallel to the central line, said central hole being defined by a hole-defining wall, said hole-defining wall of said central hole being formed with a plurality of inward grooves respectively corresponding to said through grooves, each of said sealing covers having an inner end surface abutting against a respective one of said two opposite ends of said main body, and a plurality of angularly spaced-apart bearing grooves formed in said inner end surface and communicating with said through grooves and said inward grooves, each of said track roller units having one end, and the other end that passes through one of said through grooves, that loops around a groove wall of a corresponding one of said bearing grooves of one of said sealing covers, that extends through a corresponding one of said inward grooves, that loops around a groove wall of a corresponding one of said bearing grooves of the other one of said sealing covers, and that is then connected to said one end of a corresponding one of said track roller units so as to form a closed loop.

3. The multi-mold block drive device as claimed in claim 2, further comprising a plurality of positioning sleeves each connected between said main body of one of said linear bearing units and a corresponding one of said drivers, each of said positioning sleeves being hollow cylindrical in shape and being spaced apart from and surrounding an outer portion of a respective one of said speed reduction units.

4. The multi-mold block drive device as claimed in claim 1, wherein said guide sleeve of each of said speed reduction units includes an outer sleeve having said outer surface, and an inner sleeve fixed inside said outer sleeve and having said internal thread, said outer sleeve further having an inner surface formed with a stepped inner bore that extends along the central line, said stepped inner bore having a large-diameter section, and a small-diameter section extending inwardly from said large-diameter section along the central line, said inner sleeve being fixed in said large-diameter section, said externally threaded portion of said guide screw rod being threaded through said internal thread of said inner sleeve and being received in said small-diameter section.

5. The multi-mold block drive device as claimed in claim 4, wherein said guide sleeve of each of said speed reduction units further includes an annular plate fixed to one end of said outer sleeve and adjacent to said large-diameter section, said annular plate having a plurality of angularly spaced-apart outer pin holes, said inner sleeve further having an annular end wall connected to an end periphery thereof and formed with a plurality of equiangularly spaced-apart inner pin holes surrounding the central line and coaxial with said outer pin holes, each of said planetary screws having two opposite ends respectively received in one of said inner pin holes and a corresponding one of said outer pin holes, said drive thread of each of said planetary screws being located between said two opposite ends of a corresponding one of said planetary screws.

6. An injection molding machine, comprising:
a machine base;
a feeding unit mounted on said machine base for feeding a linear material, and including a plurality of pull wheel assemblies spaced apart from each other along an axis, and a motor for driving said pull wheel assemblies;
a material feed backflow prevention device mounted on said machine base and located on a side of said feeding unit for preventing backflow of the linear material during feeding;
a multi-mold block drive device mounted on said machine base and located on a side of said material feed backflow prevention device, said multi-mold block drive device being suitable for driving a plurality of mold blocks, and including
a guide seat including an inner peripheral surface surrounding an axis and defining a mold hole, an outer peripheral surface opposite to said inner peripheral surface, a plurality of spaced-apart mold grooves formed in said inner peripheral surface and communicating with said mold hole, and a plurality of spaced-apart guide holes each of which extends through said outer peripheral surface along a central line transverse to the axis and communicates with a respective one of said mold grooves, a plurality of drivers that are disposed spaced apart from said outer peripheral surface, that are positioned relative to said guide seat, and that correspond respectively to said guide holes, and a plurality of speed reduction units each connected between one of said guide holes and a corresponding one of said drivers, each of said speed reduction units including a guide screw rod that extends along the central line and that has a non-threaded portion connected to the corresponding one of said drivers and an externally threaded portion opposite to said non-threaded portion along the central line, a guide sleeve sleeved on said guide screw rod and having an internal thread facing said externally threaded portion, and a plurality of planetary screws parallel to said guide screw rod and interposed between said guide screw rod and said guide sleeve, each of said planetary screws having a drive thread meshing with said externally threaded portion and said internal thread, said guide sleeve of each of said speed reduction units being configured to be connected to a corresponding one of the mold blocks,
wherein, when said guide screw rod of each of said speed reduction units is driven by the corresponding one of said drivers to rotate, said planetary screws are driven by said guide screw rod to rotate and move linearly along said externally threaded portion, and said guide sleeve is in turn driven by said planetary screws to move linearly therealong; and
a pair of molds that are disposed in two opposite ones of said mold grooves, that are located at a material discharge end of said material feed backflow prevention device, and that are capable of receiving a flowable raw material extruded from said material discharge end, said pair of molds being configured to be clamped and locked by the mold blocks when the mold blocks are driven by said multi-mold block drive device to move toward each other.

\* \* \* \* \*